(12) United States Patent
Shahana (10) Patent No.: US 10,988,208 B2
(45) Date of Patent: Apr. 27, 2021

(54) CONTROL DEVICE AND TRANSMISSION SYSTEM

(71) Applicant: Shimano Inc., Osaka (JP)

(72) Inventor: Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/574,863

(22) Filed: Sep. 18, 2019

(65) Prior Publication Data

US 2020/0102051 A1 Apr. 2, 2020

(30) Foreign Application Priority Data

Oct. 2, 2018 (JP) .............................. JP2018-187294

(51) Int. Cl.
*B62M 1/36* (2013.01)
*B62M 9/123* (2010.01)
*B62M 25/08* (2006.01)
*B62M 9/122* (2010.01)

(52) U.S. Cl.
CPC .............. *B62M 25/08* (2013.01); *B62M 1/36* (2013.01); *B62M 9/122* (2013.01); *B62M 9/123* (2013.01)

(58) Field of Classification Search
CPC ........ B62M 25/08; B62M 1/36; B62M 9/122; B62M 9/123
See application file for complete search history.

(56) References Cited

U.S. PATENT DOCUMENTS

| 5,599,244 | A | * | 2/1997 | Ethington | ............... | B62M 9/122 |
| | | | | | | 280/261 |
| 2016/0101827 | A1 | * | 4/2016 | Usui | ....................... | B62M 25/08 |
| | | | | | | 701/51 |
| 2016/0375958 | A1 | * | 12/2016 | Hashimoto | ............ | B62M 9/133 |
| | | | | | | 701/58 |
| 2017/0001687 | A1 | * | 1/2017 | Usui | ........................ | B62M 6/45 |
| 2017/0334514 | A1 | * | 11/2017 | Chen | ........................ | B62M 6/55 |

FOREIGN PATENT DOCUMENTS

| JP | 10-511621 A | 11/1998 | |
| JP | 11321769 A | * 11/1999 | .............. B62M 9/12 |

OTHER PUBLICATIONS

Machine translation of JP11321769, filed Sep. 29, 2020 (Year: 2020).*

* cited by examiner

*Primary Examiner* — Tisha D Lewis
(74) *Attorney, Agent, or Firm* — Global IP Counselors, LLP (57) ABSTRACT

A control device includes an electronic controller configured to control a transmission device of a human-powered vehicle in accordance with a shifting condition. The electronic controller is configured to change the shifting condition in accordance with a converging state of a first reference value that changes as the human-powered vehicle travels.

21 Claims, 5 Drawing Sheets

CONTROL DEVICE AND TRANSMISSION SYSTEM

CROSS-REFERENCE TO RELATED APPLICATIONS

This application claims priority to Japanese Patent Application No. 2018-187294, filed on Oct. 2, 2018. The entire disclosure of Japanese Patent Application No. 2018-187294 is hereby incorporated herein by reference.

BACKGROUND

Technical Field

The present invention generally relates to a control device and a transmission system.

Background Information

A known transmission system controls a transmission device of a human-powered vehicle. The typical transmission system controls the transmission device in accordance with a shifting condition set based on a rotational speed of a crank of the human-powered vehicle and a threshold value to maintain the rotational speed of the crank in a predetermined range. Japanese Laid-Open Patent Publication No. 10-511621 (Patent Document 1) discloses one example of the typical transmission system.

SUMMARY

It is preferred that a rider on a human-powered vehicle can travel comfortably. One object of the present disclosure is to provide a control device and a transmission system that improve the riding comfort of a human-powered vehicle.

A control device in accordance with a first aspect of the present disclosure comprises an electronic controller configured to control a transmission device of a human-powered vehicle in accordance with a shifting condition. The electronic controller is configured to change the shifting condition in accordance with a converging state of a first reference value that changes as the human-powered vehicle travels.

With the control device in accordance with the first aspect, the shifting condition is changed in accordance with the converging state of the first reference value that changes as the human-powered vehicle travels. Thus, a shifting control can be properly executed in accordance with each of a state in which the first reference value is not converged and a state in which the first reference value is converged. This improves the riding comfort of the human-powered vehicle.

In accordance with a second aspect of the present disclosure, the control device according to the first aspect is configured so that the electronic controller is configured to automatically control the transmission device in accordance with the shifting condition.

The control device in accordance with the second aspect improves the riding comfort of the human-powered vehicle.

In accordance with a third aspect of the present disclosure, the control device according to the first or second aspect is configured so that the electronic controller is configured to change the shifting condition upon determining a converging condition related to the first reference value is satisfied.

With the control device in accordance with the third aspect, the shifting condition is changed as the converging condition related to the first reference value is satisfied. This improves the riding comfort of the human-powered vehicle.

In accordance with a fourth aspect of the present disclosure, the control device according to the third aspect is configured so that the converging condition is set based on a change amount of the first reference value per unit time.

With the control device in accordance with the fourth aspect, the shifting condition is changed in accordance with a preferred converging condition. This improves the riding comfort of the human-powered vehicle.

In accordance with a fifth aspect of the present disclosure, the control device according to the fourth aspect is configured so that the electronic controller is configured to determine that the converging condition has been satisfied upon determining the change amount of the first reference value per unit time is smaller than a predetermined change amount.

With the control device in accordance with the fifth aspect, the shifting condition is changed in accordance with a preferred converging condition. This improves the riding comfort of the human-powered vehicle.

In accordance with a sixth aspect of the present disclosure, the control device according to any one of the third to fifth aspects is configured so that the electronic controller is configured to determine that the converging condition has been satisfied upon determining a predetermined condition is satisfied after shifting of the transmission device has been completed in accordance with the shifting condition.

With the control device in accordance with the sixth aspect, the shifting condition is changed in accordance with a preferred converging condition. This improves the riding comfort of the human-powered vehicle. Specifically, convergence of the first reference value can be expected upon determining the predetermined condition is satisfied after shifting of the shifting condition has been completed in accordance with the shifting condition. Accordingly, upon determining the shifting condition is changed in accordance with the above-described converging condition, the riding comfort of the human-powered vehicle is improved.

In accordance with a seventh aspect of the present disclosure, the control device according to the sixth aspect is configured so that the predetermined condition is set based on at least one of a rotational speed of a crank of the human-powered vehicle and an elapsed time.

The control device in accordance with the seventh aspect improves the riding comfort of the human-powered vehicle.

In accordance with an eighth aspect of the present disclosure, the control device according to any one of the third to seventh aspects is configured so that the electronic controller is configured to restore the shifting condition upon determining the converging condition is not satisfied after the converging condition has been satisfied.

With the control device in accordance with the eighth aspect, the shifting condition is changed only upon determining the converging condition related to the first reference value has been satisfied. This improves the riding comfort of the human-powered vehicle.

In accordance with a ninth aspect of the present disclosure, the control device according to any one of the first to eighth aspects is configured so that the first reference value includes traveling information related to a traveling state of the human-powered vehicle.

With the control device in accordance with the ninth aspect, the shifting condition is changed in accordance with the converging state of the first reference value that reflects the traveling state of the human-powered vehicle. This improves the riding comfort of the human-powered vehicle.

In accordance with a tenth aspect of the present disclosure, the control device according to the ninth aspect is configured so that the traveling information includes at least one of cadence, torque acting on a crank of the human-powered vehicle, vehicle speed, acceleration, and power.

The control device in accordance with the tenth aspect improves the riding comfort of the human-powered vehicle.

In accordance with an eleventh aspect of the present disclosure, the control device according to any one of the first to tenth aspects is configured so that the shifting condition is set based on a second reference value and a threshold value. The electronic controller is configured to change the threshold value in accordance with the converging state.

With the control device in accordance with the eleventh aspect, the threshold value is changed in accordance with the converging state of the first reference value. This improves the riding comfort of the human-powered vehicle.

In accordance with a twelfth aspect of the present disclosure, the control device according to the eleventh aspect is configured so that the threshold value includes a first threshold value and a second threshold value. The electronic controller is configured to control the transmission device so that a transmission ratio of the human-powered vehicle increases in accordance with a relationship of the second reference value and the first threshold value. The electronic controller is configured to control the transmission device so that the transmission ratio decreases in accordance with a relationship of the second reference value and the second threshold value.

The control device in accordance with the twelfth aspect can control the transmission device in accordance with the shifting condition in a preferred manner.

In accordance with a thirteenth aspect of the present disclosure, the control device according to the twelfth aspect is configured so that the first threshold value differs from the second threshold value.

The control device in accordance with the thirteenth aspect reduces the shifting frequency of the transmission device. This improves the riding comfort of the human-powered vehicle.

In accordance with a fourteenth aspect of the present disclosure, the control device according to the thirteenth aspect is configured so that the first threshold value has a difference of a predetermined value from the second threshold value. The electronic controller is configured to change the threshold value in accordance with the converging state to decrease the predetermined value.

With the control device in accordance with the fourteenth aspect, the threshold value is changed in accordance with the converging state of the first reference value to decrease the predetermined value. This decreases the time required for the transmission device to complete shifting in accordance with the shifting condition. Specifically, this decreases the time required for the transmission ratio of the human-powered vehicle to be in accordance with the shifting condition. This improves the riding comfort of the human-powered vehicle.

In accordance with a fifteenth aspect of the present disclosure, the control device according to the fourteenth aspect is configured so that the electronic controller is configured to change the threshold value in accordance with the converging state so that the predetermined value becomes smaller than a first predetermined value.

The control device in accordance with the fifteenth aspect improves the riding comfort of the human-powered vehicle.

In accordance with a sixteenth aspect of the present disclosure, the control device according to the thirteenth aspect is configured so that the first threshold value has a difference of a predetermined value from the second threshold value. The electronic controller is configured to change the threshold value in accordance with the converging state to increase the predetermined value.

With the control device in accordance with the sixteenth aspect, the threshold value is changed in accordance with the converging state of the first reference value to increase the predetermined value. Thus, the shifting frequency of the transmission device is reduced, and the rider can stably ride the human-powered vehicle. This improves the riding comfort of the human-powered vehicle.

In accordance with a seventeenth aspect of the present disclosure, the control device according to the sixteenth aspect is configured so that the electronic controller changes the threshold value in accordance with the converging state so that the predetermined value becomes greater than or equal to a second predetermined value.

The control device in accordance with the seventeenth aspect improves the riding comfort of the human-powered vehicle.

In accordance with an eighteenth aspect of the present disclosure, the control device according to any one of the eleventh to seventeenth aspects is configured so that the second reference value includes traveling information related to a traveling state of the human-powered vehicle.

The control device in accordance with the eighteenth aspect can control the transmission device in accordance with the shifting condition in a preferred manner.

In accordance with a nineteenth aspect of the present disclosure, the control device according to the eighteenth aspect is configured so that the traveling information includes at least one of cadence, torque acting on a crank of the human-powered vehicle, vehicle speed, acceleration, and power.

The control device in accordance with the nineteenth aspect can control the transmission device in accordance with the shifting condition in a preferred manner.

In accordance with a twentieth aspect of the present disclosure, the control device according to any one of the eleventh to nineteenth aspects is configured so that the first reference value differs in type from the second reference value.

The control device in accordance with the twentieth aspect executes the control related to changing the shifting condition independently from the control of the transmission device in accordance with the shifting condition.

A transmission system in accordance with a twenty-first aspect of the present disclosure comprises the control device and the transmission device.

With the control transmission system in accordance with the twenty-first aspect, the shifting condition is changed in accordance with the converging state of the first reference value that changes as the human-powered vehicle travels. Thus, a shifting control can be properly executed in accordance with each of a state in which the first reference value is not converged and a state in which the first reference value is converged. This improves the riding comfort of the human-powered vehicle.

The control device and the transmission system in accordance with the present disclosure improve the riding comfort of the human-powered vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
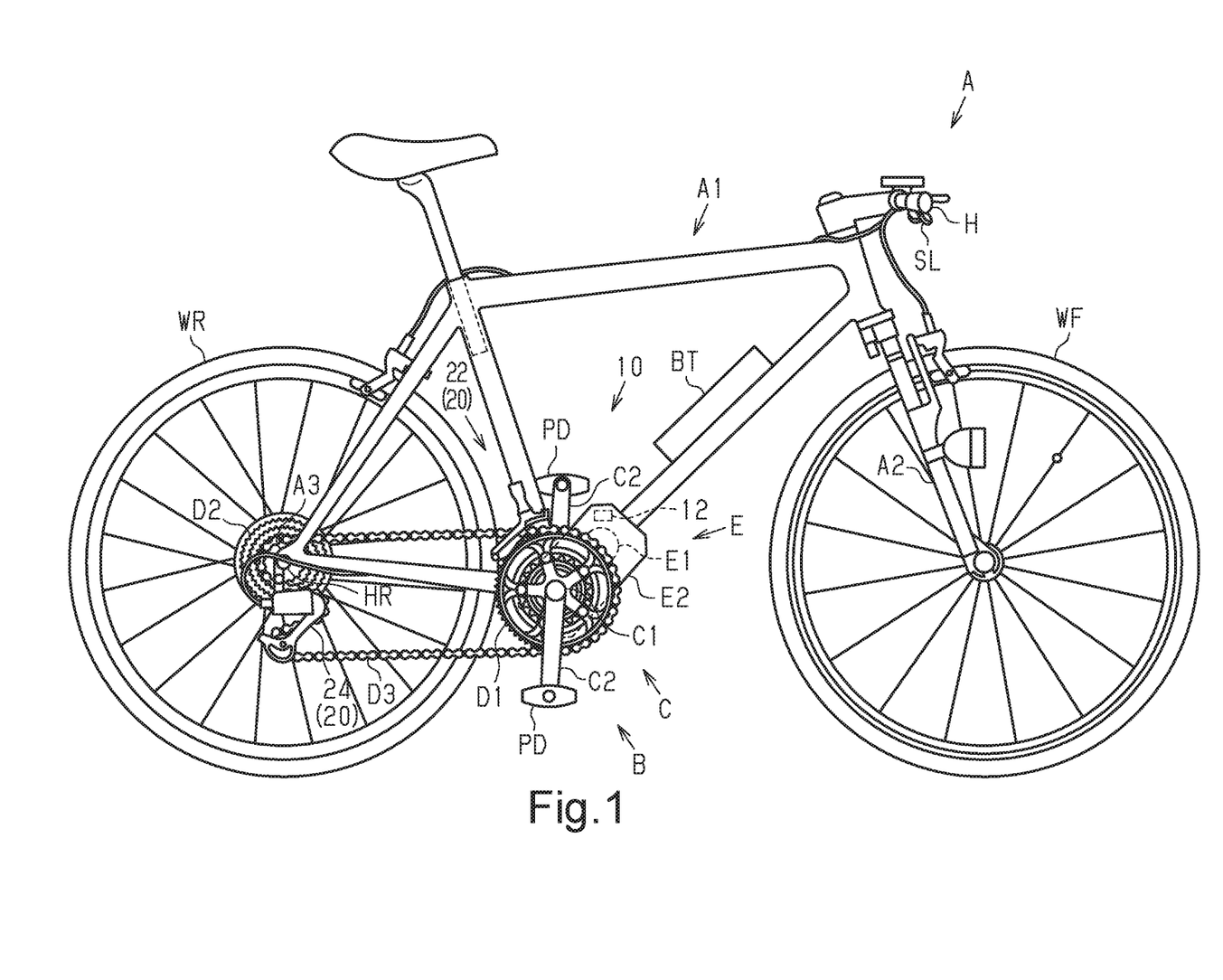
FIG. 1 is a side elevational view of a human-powered vehicle including a control device and a transmission system in accordance with an embodiment.

A human-powered vehicle A including a transmission system 10 will now be described with reference to FIG. 1. The human-powered vehicle is a vehicle that can be driven by at least human force, which includes a vehicle that assists human force with electric driving. The human-powered vehicle does not include vehicles using only a prime mover that is not human force. In particular, the human-powered vehicle does not include vehicles that use only an internal combustion engine as the prime mover. The human-powered vehicle is a compact light vehicle that does not require a license for driving on a public road. The illustrated human-powered vehicle A is a bicycle including an electric assist unit E that assists the propulsion of the human-powered vehicle A by using electric energy. Specifically, the illustrated human-powered vehicle A is a trekking bike. The human-powered vehicle A further includes a frame A1, a front fork A2, a front wheel WF, a rear wheel WR, a handlebar H, and a drive train B.

The drive train B is, for example, of a chain drive type. The drive train B includes a crank C, a front sprocket D1, a rear sprocket D2, and a chain D3. The crank C includes a crankshaft C1 and two crank arms C2. The crankshaft C1 is rotatably supported by the frame A1. The two crank arms C2 are provided on two ends of the crankshaft C1, respectively. A pedal PD is rotatably coupled to a distal end of each crank arm C2. The drive train B can be of any type such as a belt drive type or a shaft drive type.

The front sprocket D1 is provided on the crank C so as to rotate integrally with the crankshaft C1. The rear sprocket D2 is provided on a hub HR of the rear wheel WR. The chain D3 is wound around the front sprocket D1 and the rear sprocket D2. The human driving force applied to the pedals PD by a rider riding the human-powered vehicle A is transmitted via the front sprocket D1, the chain D3, and the rear sprocket D2 to the rear wheel WR.

The electric assist unit E is actuated to assist propulsion of the human-powered vehicle A. For example, the electric assist unit E is actuated in accordance with the human driving force applied to the pedals PD. The electric assist unit E includes an electric motor E1. The electric assist unit E is actuated with electric power supplied from a battery BT mounted on the human-powered vehicle A.

The transmission system 10 includes a control device 12 and a transmission device 20. The control device 12 is, for example, accommodated in a housing E2 of the electric assist unit E. The control device 12 is actuated by electric power supplied from the battery BT. The transmission device 20 is configured to be driven mechanically or electrically, for example, in accordance with operation of a shift lever SL or the like. In a case where the transmission device 20 is actuated electrically, the transmission device 20 is actuated by electric power supplied from the battery BT, or electric power supplied from a dedicated power source mounted on the transmission device 20. The transmission device 20 includes an external shifting device. In one example, the transmission device 20 includes at least one of a front derailleur 22 and a rear derailleur 24. The front derailleur 22 is provided in the vicinity of the front sprocket D1. The front derailleur 22 is driven to change the front sprocket D1, around which the chain D3 is wound, thereby changing a transmission ratio of the human-powered vehicle A. The rear derailleur 24 is provided at a rear end A3 of the frame A1. The rear derailleur 24 is driven to change the rear sprocket D2, around which the chain D3 is wound, thereby changing the transmission ratio of the human-powered vehicle A. The transmission device 20 can include an internal shifting device instead of the external shifting device. In this case, the internal shifting device is provided, for example, on the hub HR of the rear wheel HR. The transmission device 20 can include a continuously variable transmission instead of the external shifting device. In this case, the continuously variable transmission is provided, for example, on the hub HR of the rear wheel WR.

The specific configuration of the control device 12 will now be described with reference to FIG. 2. The control device 12 includes an electronic controller 14 configured to control the transmission device 20 of the human-powered vehicle A in accordance with a shifting condition. The electronic controller 14 is formed of one or more semiconductor chips that are mounted on a circuit board. The term "electronic controller" as used herein refers to hardware that executes a software program, and does not include a human. For simplicity, the electronic controller 14 will be hereinafter referred to as the controller 14. The controller 14 is a central processing unit (CPU) or a micro-processing unit (MPU) that includes at least one processor 14a. In one example, the controller 14 automatically controls the transmission device 20 in accordance with the shifting condition. The shifting condition includes a condition for automatically controlling the transmission device 20. The controller 14, for example, can control the transmission device 20 in accordance with an operation of the shift lever SL. The controller 14 can control various components mounted on the human-powered vehicle A in addition to the transmission device 20 of the human-powered vehicle A. The control device 12 further includes storage 16 that stores various types of information. The storage 16 is any computer storage device or any non-transitory computer-readable medium with the sole exception of a transitory, propagating signal. For example, the storage 16 includes a non-volatile memory and a volatile memory. The storage 16 stores, for example, various control programs and preset information. The controller 14 may be one or more integrated circuits having firmware for causing the circuitry to complete the activities described herein. Of course, any number of other analog and/or digital components capable of performing the below described functionality can be provided in place of, or in conjunction with the described controller elements.

The controller 14 changes the shifting condition in accordance with a converging state of a first reference value RV1 that changes as the human-powered vehicle A travels. The converging state of the first reference value RV1 is a state in which the first reference value RV1 is converged. Thus, the controller 14 changes the shifting condition upon determining the first reference value RV1 becomes steady. Specifically, the controller 14 changes the shifting condition upon determining the first reference value RV1 shifts from a transient state to a steady state.

The first reference value RV1 includes traveling information related to a traveling state of the human-powered vehicle A. The traveling information included in the first reference value RV1 includes at least one of cadence, torque acting on the crank C of the human-powered vehicle A, vehicle speed, acceleration, and power. The cadence corresponds to the rotational speed of the crank C. The power is the product of cadence and torque. The first reference value RV1 differs in type from a second reference value RV2, which will be described later. In one example, the first reference value RV1 includes the vehicle speed. The type of the first reference value RV1 can be the same as that of the second reference value RV2.

The controller 14 changes the shifting condition upon determining the converging condition related to the first reference value RV1 is satisfied. The converging condition related to the first reference value RV1 is a condition for determining whether the first reference value RV1 is converged. In one example, the converging condition is satisfied if the first reference value RV1 is converged. In other words, the converging condition is satisfied if that the first reference value RV1 is in the steady state. In one example, the converging condition is not satisfied if that the first reference value RV1 is not converged. In other words, the converging condition is not satisfied if that the first reference value RV1 is in the transient state.

Figure 3:
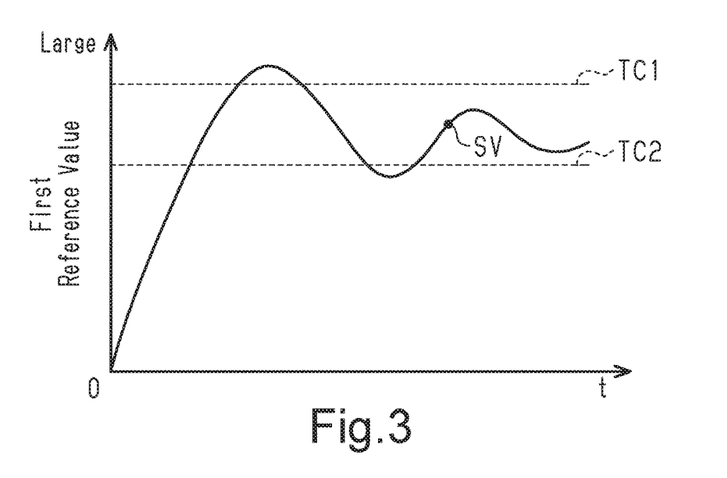
FIG. 3 is a graph illustrating one example of a converging condition related to a first reference value.

The converging condition related to the first reference value RV1 is set, for example, based on at least one of a first example and a second example that will now be described. In the first example, the converging condition is set based on a change amount of the first reference value RV1 per unit time. In the example shown in FIG. 3, the controller 14 determines that the converging condition has been satisfied upon determining the change amount of the first reference value RV1 per unit time is less than a predetermined change amount. In contrast, the controller 14 determines that the converging condition has not been satisfied upon determining the change amount of the first reference value RV1 per unit time is greater than or equal to the predetermined change amount. One example of the unit time is ten seconds. The change amount of the first reference value RV1 includes an increase-decrease amount of the first reference value RV1 or an increase-decrease ratio of the first reference value RV1. In a case where the change amount of the first reference value RV1 includes the increase-decrease ratio of the first reference value RV1, the converging condition related to the first reference value RV1 can be described as below. The converging condition is set based on a change ratio of the first reference value RV1 per unit time. In this case, the controller 14 determines that the converging condition has been satisfied upon determining the change ratio of the first reference value RV1 per unit time is less than a predetermined change ratio.

The predetermined change amount is set based on a first change threshold value TC1 and a second change threshold value TC2. The first change threshold value TC1 determines, for example, an upper limit value of the change amount of the first reference value RV1 per unit time. The second change threshold value TC2 determines, for example, a lower limit value of the change amount of the first reference value RV1 per unit time. The change threshold values TC1 and TC2 change in accordance with changes in the first reference value RV1. In one example, the controller 14 determines that the converging condition has been satisfied upon determining the change amount of the first reference value RV1 per unit time is between the first change threshold value TC1 and the second change threshold value TC2. The predetermined change amount can be varied in accordance with the type of the first reference value RV1. The broken lines shown in FIG. 3 respectively indicate the change threshold values TC1 and TC2 corresponding to a reference value SV, which is one example of the first reference value RV1, in a chronological order of the first reference value RV1.

In the second example, the converging condition is set based on the relationship of a predetermined condition and the shifting performed by the transmission device 20 in accordance with the shifting condition. In one example, the controller 14 determines that the converging condition has been satisfied in a case the predetermined condition is satisfied after the shifting of the transmission device 20 has been completed in accordance with the shifting condition. The controller 14 determines that the converging condition has not been satisfied after shifting performed by the transmission device 20 in accordance with the shifting condition is completed upon determining the shifting of the transmission device 20 is further performed in accordance with the shifting condition before the predetermined condition is satisfied. In a case where the predetermined condition is satisfied after the shifting of the transmission device 20 has been completed in accordance with the shifting condition, it can be expected that the first reference value RV1 has been converged.

The predetermined condition is set based on at least one of the rotational speed of the crank C of the human-powered vehicle A and an elapsed time. In one example, the controller 14 determines that the predetermined condition has been satisfied upon determining the crank C has been rotated a predetermined number of times after the shifting of the transmission device 20 has been completed in accordance with the shifting condition. In other words, the controller 14 determines that the predetermined condition has not been satisfied upon determining the shifting condition is not satisfied while the crank C is being rotated the predetermined number of times. In another example, the controller 14 determines that the predetermined condition has been satisfied upon determining a predetermined length of time elapses after the shifting of the transmission device 20 has been completed in accordance with the shifting condition. In other words, the controller 14 determines that the predetermined condition has been satisfied upon determining the shifting condition is not satisfied before the predetermined length of time elapses. In a further example, the controller 14 determines that the predetermined condition has been satisfied upon determining the crank C has been rotated a predetermined number of times and a predetermined length of time has elapsed after the transmission device 20 completes shifting in accordance with the shifting condition. In other words, the controller 14 determines that the predetermined condition has been satisfied upon determining the shifting condition is not satisfied while the crank C is being rotated the predetermined number of times and before the predetermined length of time elapses. The predetermined number of times and the predetermined length of time are set in advance in accordance with a typical shifting interval of the transmission device 20 corresponding to the shifting condition.

Figure 4:
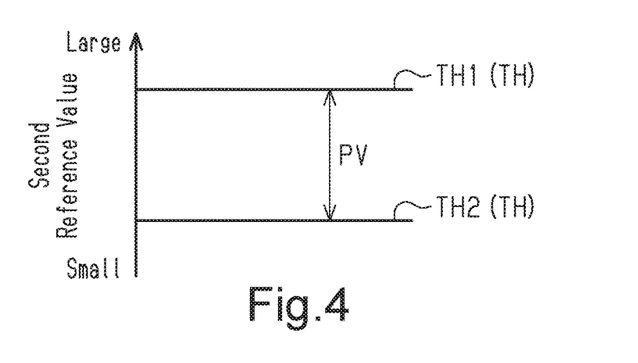
FIG. 4 is a map illustrating one example of a shifting condition used for a control of a transmission device.

As illustrated in FIG. 4, the shifting condition is set based on the second reference value RV2 and a threshold value TH. The second reference value RV2 includes the traveling information related to the traveling state of the human-powered vehicle A. The traveling information included in the second reference value RV2 includes at least one of cadence, torque acting on the crank C of the human-powered vehicle A, vehicle speed, acceleration, and power. In one example, the second reference value RV2 includes cadence.

The threshold value TH includes a first threshold value TH1 and a second threshold value TH2. The controller 14 controls the transmission device 20 so that a transmission ratio of the human-powered vehicle A increases in accordance with a relationship of the second reference value RV2 and the first threshold value TH1. Further, the controller 14 controls the transmission device 20 so that the transmission ratio of the human-powered vehicle A decreases in accordance with a relationship of the second reference value RV2 and the second threshold value TH2. The first threshold value TH1 differs from the second threshold value TH2. That is, the threshold values TH1 and TH2 that determine the shifting condition have a predetermined range. In one example, the first threshold value TH1 has a difference of a predetermined value PV from the second threshold value TH2. The predetermined value PV is a predetermined width that sets the predetermined range. In the present embodiment, the first threshold value TH1 is greater than the second threshold value TH2. In one example, the controller 14 controls the transmission device 20 so that the transmission ratio of the human-powered vehicle A increases upon determining the second reference value RV2 becomes greater than the first threshold value TH1. Further, the controller 14 controls the transmission device 20 so that the transmission ratio of the human-powered vehicle A decrease upon determining the second reference value RV2 becomes less than the second threshold value TH2.

The controller 14 changes the threshold value TH in accordance with the converging state of the first reference value RV1. The controller 14 executes a first control or a second control, for example, in accordance with the converging state of the first reference value RV1. During the first control and second control, the controller 14 can execute a preset control or a control selected by an operation of an operation unit mounted on the human-powered vehicle A. During the first control and second control, the controller 14 can execute a control selected in accordance with the traveling information related to the traveling state of the human-powered vehicle A, environment information related to traveling environment of the human-powered vehicle A, or the like. The environment information includes at least one of road surface information related to the condition of the road surface, air resistance information related to the air resistance, weather information related to the weather, and temperature information related to the temperature.

Figure 5:
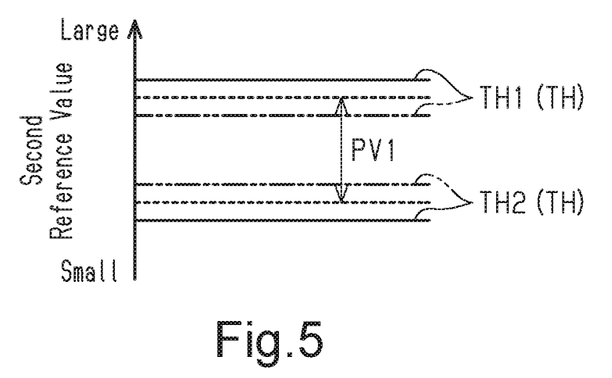
FIG. 5 is a map illustrating one example of the shifting condition based on a first control.

As illustrated in FIG. 5, the controller 14 executes the first control in accordance with the converging state of the first reference value RV1. During the first control, the controller 14 changes the threshold value TH in accordance with the converging state of the first reference value RV1 to decrease the predetermined value PV. In one example, the controller 14 changes the threshold value TH in accordance with the converging state of the first reference value RV1 so that the predetermined value PV becomes less than a first predetermined value PV1. Specifically, upon determining the converging condition related to the first reference value RV1 is satisfied, the controller 14 changes at least one of the first threshold value TH1 and the second threshold value TH2 so that the predetermined value PV becomes less than the first predetermined value PV1. The first predetermined value PV1 can be set based on the threshold values TH1 and TH2 before being changed in the first control. The threshold values TH1 and TH2 indicated by the solid lines in FIG. 5 show one example of the threshold values TH1 and TH2 before being changed. The threshold values TH1 and TH2 indicated by the double-dashed lines in FIG. 5 show one example of the threshold values TH1 and TH2 after being changed.

Figure 6:
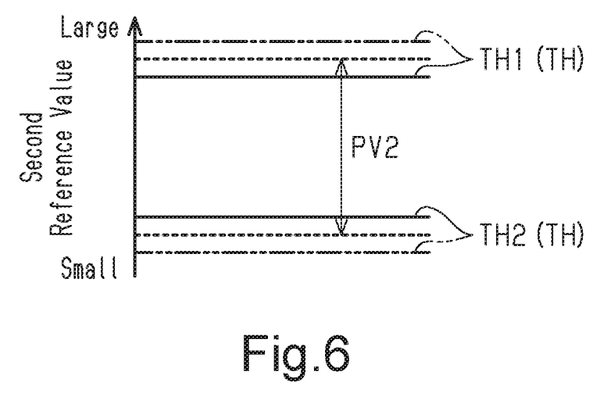
FIG. 6 is a map illustrating one example of the shifting condition based on a second control.

As illustrated in FIG. 6, the controller 14 executes the second control in accordance with the converging state of the first reference value RV1. During the second control, the controller 14 changes the threshold value TH in accordance with the converging state of the first reference value RV1 to increase the predetermined value PV. In one example, the controller 14 changes the threshold value TH in accordance with the converging state of the first reference value RV1 so that the predetermined value PV becomes greater than or equal to a second predetermined value PV2. Specifically, upon determining the converging condition related to the first reference value RV1 is satisfied, the controller 14 changes at least one of the first threshold value TH1 and the second threshold value TH2 so that the predetermined value PV becomes greater than or equal to the second predetermined value PV2. The second predetermined value PV2 differs from the first predetermined value PV1. In one example, the second predetermined value PV2 is greater than the first predetermined value PV1. The second predetermined value PV2 can be set based on the threshold values TH1 and TH2 before being changed during the second control. The threshold values TH1 and TH2 indicated by the solid lines in FIG. 6 show one example of the threshold values TH1 and TH2 before being changed. The threshold values TH1 and TH2 indicated by the double-dashed lines in FIG. 6 show one example of the threshold values TH1 and TH2 after being changed. The second predetermined value PV2 can be same as the first predetermined value PV1. In this case, the threshold values TH1 and TH2 before being changed in the first control differ from the threshold values TH1 and TH2 before being changed in the second control.

The controller 14 restores the shifting condition upon determining the converging condition is not satisfied after the converging condition related to the first reference value RV1 has been satisfied. In this case, the threshold values TH1 and TH2, which have been changed as the converging condition related to the first reference value RV1 is satisfied, are restored to the original threshold values TH1 and TH2 used before being changed. In one example, the controller 14 changes the shifting condition upon determining the converging condition related to the first reference value RV1 is satisfied. Subsequently, the controller 14 restores the shifting condition upon determining the converging condition is no longer satisfied. In other words, the controller 14 changes the shifting condition upon determining the first reference value RV1 shifts from the steady state to the transient state and then restores the shifting condition upon determining the first reference value RV1 shifts from the transient state to the steady state.

Figure 2:
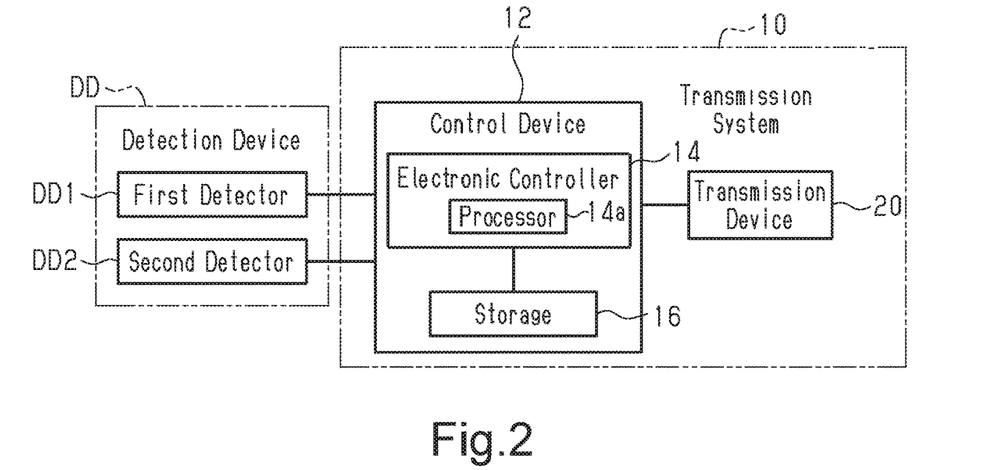
FIG. 2 is a block diagram of a transmission system and showing electrical connections between the control device shown in FIG. 1 and various components.

As shown in FIG. 2, the human-powered vehicle A further includes a detection device DD that detects various types of information. The detection device DD includes a first detector DD1 and a second detector DD2. The first detector DD1 is, for example, configured to detect the first reference value RV1. In one example, the first detector DD1 includes various sensors configured to detect the first reference value RV1. The first detector DD1 outputs information related to the detected first reference value RV1 to the controller 14. The second detector DD2 is, for example, configured to detect the second reference value RV2. In one example, the second detector DD2 includes various sensors configured to detect the second reference value RV2. The second detector DD2 outputs information related to the detected second reference value RV2 to the controller 14. In the case where the type of the first reference value RV1 is the same as that of the second reference value RV2, the first detector DD1 or the second detector DD2 can be omitted.

Figure 7:
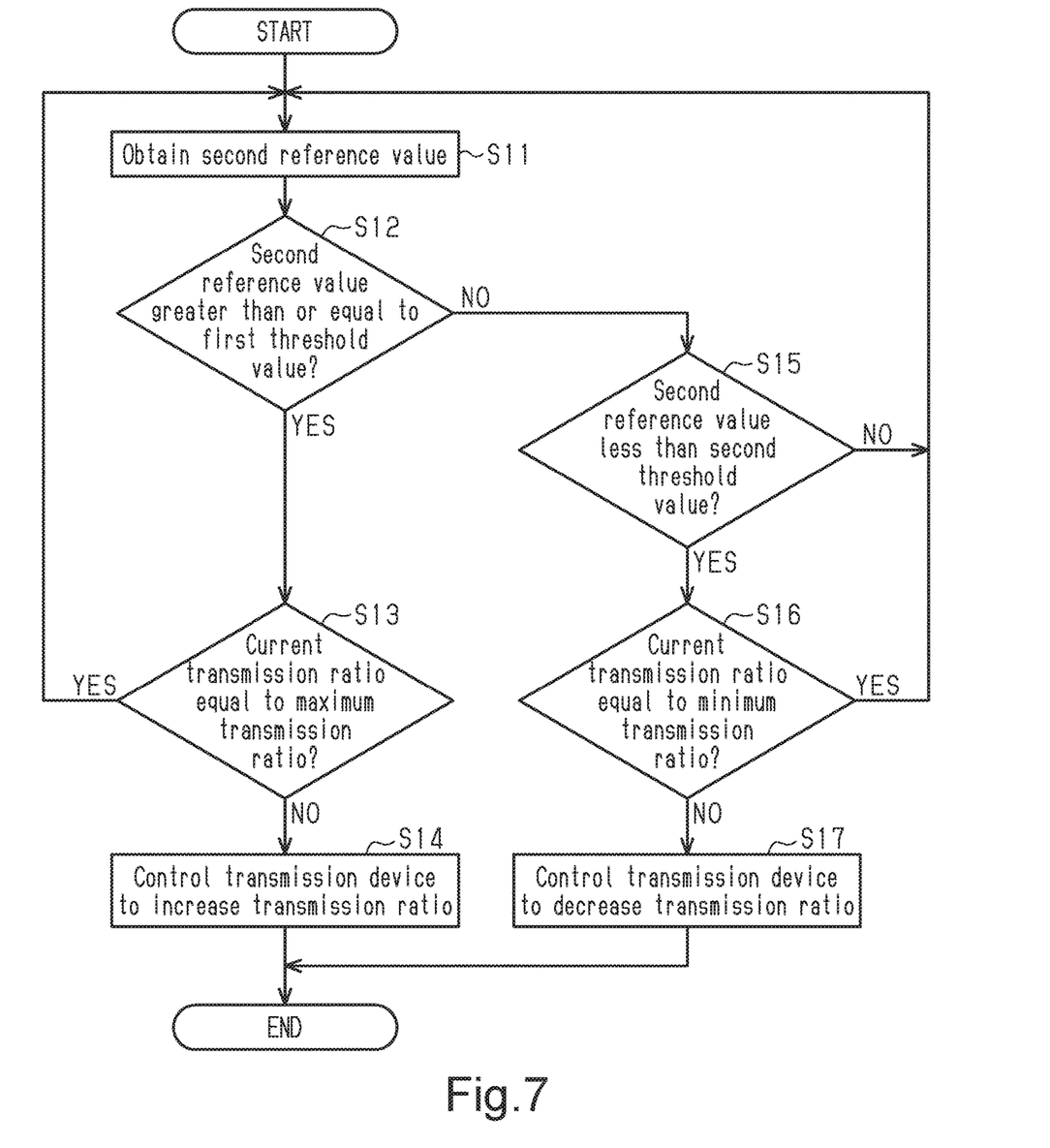
FIG. 7 is a flowchart illustrating one example of an automatic shifting control executed by the control device shown in FIG. 1.

With reference to FIG. 7, one example of an automatic shifting control executed by the control device 12 will now be described. The controller 14 executes the automatic shifting control that automatically controls the transmission device 20 of the human-powered vehicle A in accordance with the shifting condition, for example, in a process described below. In step S11, the controller 14 obtains the second reference value RV2. Specifically, the controller 14 obtains information related to cadence from the second detector DD2. In step S12, the controller 14 determines whether the second reference value RV2 is greater than or equal to the first threshold value TH1. In a case where the controller 14 determines that the second reference value RV2 is greater than or equal to the first threshold value TH1 in step S12, the controller 14 proceeds to step S13.

In step S13, the controller 14 determines whether the current transmission ratio of the human-powered vehicle A is the maximum transmission ratio. The maximum transmission ratio of the human-powered vehicle A is the maximum transmission ratio based on the relationship of the front sprocket D1 and the rear sprocket D2. In a case where the controller 14 determines that the current transmission ratio of the human-powered vehicle A is the maximum transmission ratio in step S13, the controller 14 returns to step S11. In a case where the controller 14 determines that the current transmission ratio of the human-powered vehicle A is not the maximum transmission ratio, the controller 14 proceeds to step S14. In step S14, the controller 14 controls the transmission device 20 to increase the transmission ratio of the human-powered vehicle A.

In a case where the controller 14 determines that the second reference value RV2 is less than the first threshold value TH1 in step S12, the controller 14 proceeds to step S15. In step S15, the controller 14 determines whether the second reference value RV2 is less than the second threshold value TH2. In a case where the controller 14 determines that the second reference value RV2 is greater than or equal to the second threshold value TH2 in step S15, the controller 14 returns to step S11. In a case where the controller 14 determines that the second reference value RV2 is less than the second threshold value TH2, the controller 14 proceeds to step S16.

In step S16, the controller 14 determines whether the current transmission ratio of the human-powered vehicle A is the minimum transmission ratio. The minimum transmission ratio of the human-powered vehicle A is the minimum transmission ratio based on the relationship of the front sprocket D1 and the rear sprocket D2. In a case where the controller 14 determines that the current transmission ratio of the human-powered vehicle A is the minimum transmission ratio in step S16, the controller 14 returns to step S11. In case where the controller 14 determines that the current transmission ratio of the human-powered vehicle A is not the minimum transmission ratio in step S16, the controller 14 proceeds to step S17. In step S17, the controller 14 controls the transmission device 20 to decrease the transmission ratio of the human-powered vehicle A. This completes the process of steps S11 to S17. The controller 14 repeats the automatic shifting control including steps S11 to S17, for example, as the human-powered vehicle A travels.

Figure 8:
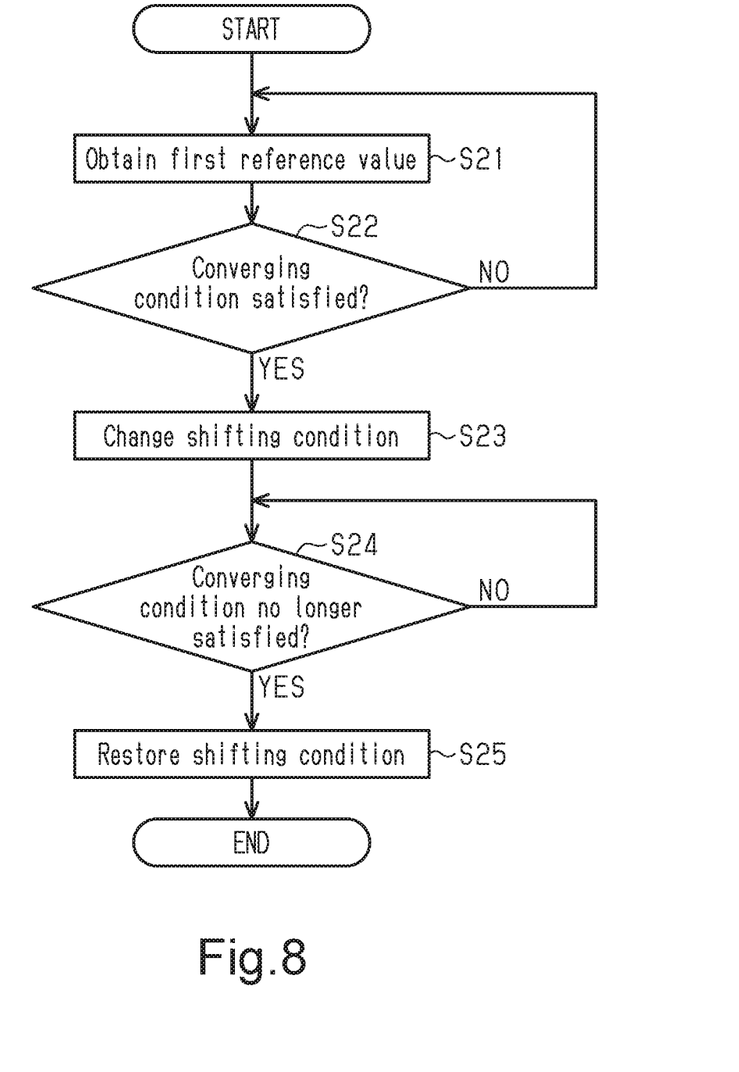
FIG. 8 is a flowchart illustrating one example of a condition changing control executed by the control device shown in FIG. 1.

With reference to FIG. 8, one example of a condition changing control executed by the control device 12 will now be described. The controller 14 executes the condition changing control that changes the shifting condition in accordance with the converging state of the first reference value RV1, for example, in a process described below. In step S21, the controller 14 obtains the first reference value RV1. Specifically, the controller 14 obtains information related to the vehicle speed from the first detector DD1. In step 22, the controller 14 determines whether the converging condition related to the first reference value RV1 has been satisfied. In a case where the controller 14 determines that the converging condition related to the first reference value RV1 has not been satisfied, the controller returns to step S21. In a case where the controller 14 determines that the converging condition related to the first reference value RV1 has been satisfied in step S22, the controller 14 proceeds to step S23. In step S23, the controller 14 changes the shifting condition. Specifically, the controller 14 changes the shifting condition by executing the first control or the second control.

In step S24, the controller 14 determines whether the converging condition related to the first reference value RV1 is no longer satisfied. In a case where the controller 14 determines that the converging condition related to the first reference value RV1 has been satisfied in step S24, the controller 14 repeats step S24. In a case where the controller 14 determines that the converging condition related to the first reference value RV1 is no longer satisfied, the controller 14 proceeds to step S25. In step S25, the controller 14 restores the shifting condition. This completes the process of steps S21 to S25. The controller 14 repeats the condition changing control including steps S21 to S25, for example, as the human-powered vehicle A travels.

Modifications

The description related with the above embodiment exemplifies, without any intention to limit, an applicable form of a control device and a transmission system according to the present disclosure. In addition to the embodiment described above, the control device and the transmission system in accordance with the present disclosure are applicable to, for example, modifications of the above embodiment that are described below and combinations of at least two of the modifications that do not contradict each other. In the modifications described hereafter, same reference numerals are given to those components that are the same as the corresponding components of the above embodiment. Such components will not be described in detail.

The converging state of the first reference value RV1 can be changed in any manner. In one example, the converging state of the first reference value RV1 represents a state in which the first reference value RV1 is not converged. In this case, the controller 14 changes the shifting condition upon determining the first reference value RV1 is in the transient state. Specifically, the controller 14 changes the shifting condition upon determining the first reference value RV1 shifts from the steady state to the transient state.

The first reference value RV1 can be changed to any type of value. In a first example, the first reference value RV1 includes the environment information related to the traveling environment of the human-powered vehicle A. In a second example, the first reference value RV1 includes at least one of the traveling information and the environment information.

The second reference value RV2 can be changed to any type of value. In a first example, the second reference value RV2 includes the environment information related to the traveling environment of the human-powered vehicle A. In a second example, the second reference value RV2 includes at least one of the traveling information and the environment information. In a third example, in the condition changing control, the type of the second reference value RV2 used for the shifting condition before being changed differ from the type of the second reference value RV2 used for the shifting condition after being changed.

The content of the control executed by the controller 14 can be changed to any content. In one example, the controller 14 does not restore the shifting condition even upon determining the converging condition is no longer satisfied after the converging condition related to the first reference value RV1 has been satisfied. In this case, the controller 14 restores the shifting condition, for example, upon determining the human-powered vehicle A stops.

The contents of the shifting condition can be changed in any manner. In one example, the shifting condition includes a condition for a manual operation, which is related to an operation of the shift lever SL, and a condition for automatically controlling the transmission device 20. The controller 14 switches the condition for the manual operation related to the operation of the shift lever SL and the condition for automatically controlling the transmission device 20, for example, in accordance with the converging state of the first reference value RV1. In other words, the controller 14 switches a manual shifting control and an automatic shifting control in accordance with the converging state of the first reference value RV1. For example, during the manual shifting control, the controller 14 properly controls the transmission device 20 in accordance with the operation of the shift lever SL. Upon determining the converging condition related to the first reference value RV1 is satisfied, the controller 14 can shift from the manual shifting control to the automatic shifting control or switch from the automatic shifting control to the manual shifting control.

The human-powered vehicle A can be of any types. In the first example, the human-powered vehicle A is a road bike, a mountain bike, a cross bike, a city cycle, a cargo bike, or a recumbent bicycle. In the second example, the human-powered vehicle A is a kick scooter.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

What is claimed is:

1. A control device comprising:
an electronic controller configured to control a transmission device of a human-powered vehicle in accordance with a shifting condition, the shifting condition being a condition for controlling the transmission device based on a relationship between a second reference value and a threshold value,
the electronic controller being configured to change the shifting condition by changing the threshold value or switching between manual and automatic control of the transmission device based on a determination of whether a first reference value, that changes as the human-powered vehicle travels, is in a steady state or a transient state.

2. The control device according to claim 1, wherein
the electronic controller is configured to automatically control the transmission device in accordance with the shifting condition.

3. The control device according to claim 1, wherein
the electronic controller is configured to change the shifting condition upon determining a converging condition related to the first reference value is satisfied.

4. The control device according to claim 3, wherein
the converging condition is set based on a change amount of the first reference value per unit time.

5. The control device according to claim 4, wherein
the electronic controller is configured to determine that the converging condition has been satisfied upon determining the change amount of the first reference value per unit time is smaller than a predetermined change amount.

6. The control device according to claim 1, wherein
the electronic controller is configured to determine that the converging condition has been satisfied upon determining a predetermined condition is satisfied after shifting of the transmission device has been completed in accordance with the shifting condition.

7. The control device according to claim 6, wherein
the predetermined condition is set based on at least one of a rotational speed of a crank of the human-powered vehicle and an elapsed time.

8. The control device according to claim 3, wherein
the electronic controller is configured to restore the shifting condition upon determining the converging condition is not satisfied after the converging condition has been satisfied.

9. The control device according to claim 1, wherein
the first reference value includes traveling information related to a traveling state of the human-powered vehicle.

10. The control device according to claim 9, wherein
the traveling information includes at least one of cadence, torque acting on a crank of the human-powered vehicle, vehicle speed, acceleration, and power.

11. The control device according to claim 1, wherein
the shifting condition is set based on the second reference value and the threshold value, and
the electronic controller is configured to change the threshold value based on the determination of whether the first reference value is in the steady state or the transient state.

12. The control device according to claim 11, wherein
the threshold value includes a first threshold value and a second threshold value,
the electronic controller is configured to control the transmission device so that a transmission ratio of the human-powered vehicle increases in accordance with a relationship between the second reference value and the first threshold value, and the electronic controller is configured to control the transmission device so that the transmission ratio decreases in accordance with a relationship between the second reference value and the second threshold value.

13. The control device according to claim 12, wherein the first threshold value differs from the second threshold value.

14. The control device according to claim 13, wherein the first threshold value has a difference of a predetermined value from the second threshold value; and
the electronic controller is configured to change the threshold value to decrease the predetermined value based on the determination of whether the first reference value is in the steady state or the transient state.

15. The control device according to claim 14, wherein the electronic controller is configured to change the threshold value so that the predetermined value becomes smaller than a first predetermined value based on the determination of whether the first reference value is in the steady state or the transient state.

16. The control device according to claim 13, wherein the first threshold value has a difference of a predetermined value from the second threshold value; and
the electronic controller is configured to change the threshold value to increase the predetermined value based on the determination of whether the first reference value is in the steady state or the transient state.

17. The control device according to claim 16, wherein the electronic controller is configured to change the threshold value so that the predetermined value becomes greater than or equal to a second predetermined value based on the determination of whether the first reference value is in the steady state or the transient state.

18. The control device according to claim 11, wherein the second reference value includes traveling information related to a traveling state of the human-powered vehicle.

19. The control device according to claim 18, wherein the traveling information includes at least one of cadence, torque acting on a crank of the human-powered vehicle, vehicle speed, acceleration, and power.

20. The control device according to claim 11, wherein the first reference value differs in type from the second reference value.

21. A transmission system comprising the control device according to claim 1 and further comprising:
the transmission device.

* * * * *